Patented Dec. 7, 1937

2,101,094

UNITED STATES PATENT OFFICE 2,101,094

ARYLAMINO ANTHRAQUINONE DYESTUFFS AND PROCESS FOR THEIR MANUFACTURE

Albin Peter, Basel, Switzerland, assignor to the firm Chemical Works formerly Sandoz, Basel, Switzerland No Drawing. Original application March 13, 1935, Serial No. 10,938. Divided and this application December 28, 1936, Serial No. 117,973. In Germany March 21, 1934

8 Claims. (Cl. 260—60)

The present application relates to new anthraquinone dyestuffs and to a process for their manufacture, this application being a division of application Ser. No. 10,938 filed by the applicant on March 13, 1935.

It has been found that new valuable dyestuffs of the anthraquinone series can be prepared by condensing aromatic amines of the general formula

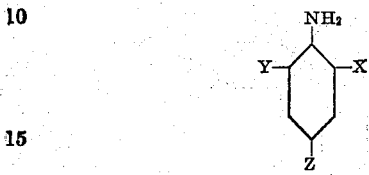

wherein X represents methyl or ethyl, Y represents methyl, ethyl or halogen and Z represents hydrogen or methyl, with such anthraquinone derivatives that contain at least two groups replaceable by an aromatic amine.

The aromatic amines useful for the production of the new anthraquinone dyestuffs are for example 1-amino-2,4,6-trimethylbenzene, 1-amino-2,6- dimethylbenzene, 1-amino -2,4- dimethyl -6- bromobenzene, 1-amino -6- ethyl -2,4- dimethylbenzene or the like.

The anthraquinone derivatives which can be used in the present process are for example the 1,4- or 1,5- or 1,8- or 1,7- or 1,6-dichloro-anthraquinones, further the derivatives of α-hydroxyanthraquinones, such as the leuco-1,4-dihydroxyanthraquinone.

The condensation of the anthraquinone derivatives with the aromatic bases of the above cited configuration is generally carried out in presence of a solvent and a catalyst, at temperatures between 50° and 250° C., and in an open or in a closed vessel. As suitable solvents the following ones, or mixtures thereof, can be used: water, ethanol, methanol, chlorobenzene, nitrobenzene, dimethylaniline, phenol, glacial acetic acid and the o-o-disubstituted aromatic bases themselves, when they are used in excess.

As catalyst generally finely divided copper or copper salts are used, but it is also possible to carry out the condensation in absence of copper.

Sometimes it is advantageous to carry out the condensation in an inert atmosphere, for example in nitrogen or carbon dioxide atmosphere, preferably under addition to the reaction mixture of acid-binding agents, such as sodium-, potassium- or ammonium-acetate, sodium- or potassium-carbonate or bicarbonate, soap and the like.

The condensation products obtained according to the present process are, when they are not sulphonated, valuable compounds for the dyeing of lacquers, such as nitro-cellulose lacquers, or of cellulose esters and ethers.

In order to prepare water-soluble dyestuffs from water-insoluble condensation products these are sulphonated with sulphuric acid or fuming sulphuric acid of an appropriate concentration of $SO_3$ or with chlorosulphonic acid, whereby one or more sulphonic acid groups will be introduced into the aryl or into the anthraquinone nucleus.

The dyestuffs prepared according to the process cited above are, when they are soluble in water, very valuable dyestuffs for animal fibres such as wool and natural silk. The use of the aromatic amines substituted in both ortho-positions to the amino group allows to obtain dyestuffs with very pure and brilliant shades and of excellent fastness properties.

One object of the present invention is, therefore, the anthraquinone dyestuffs containing in their molecule at least two groups

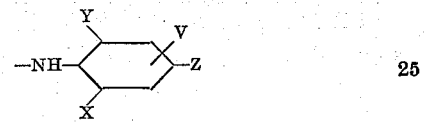

wherein X represents methyl or ethyl, Y represents halogen, methyl or ethyl and V represents hydrogen or a sulpho group, and Z represents hydrogen or methyl.

Another object of the present invention is the process for the manufacture of anthraquinone dyestuffs, consisting in condensing one molecule of an anthraquinone derivative with at least two molecules of the above listed o-o-disubstituted aromatic amines of the benzene series.

Still another object of the present invention is the process for the condensation of anthraquinone derivatives with the o-o-disubstituted aromatic amines of the benzene series, consisting in performing the condensation in presence of solvents or diluents and catalysts, such as copper or copper salts, and in presence of acid-binding agents and at temperatures between 50° and 250° C.

Still another object of the present invention is the condensation process, wherein as acid-binding agents an excess of the o-o-disubstituted aromatic amines of the benzene series is used.

Still another object of the present invention is the process of transforming the water-insoluble condensation products of anthraquinone derivatives with the o-o-disubstituted aromatic amines into water-soluble dyestuffs by treating them with sulphonating agents, such as sulphuric acid, fuming sulphuric acid or chlorosulphonic acid.

The following example, without being limitative, illustrates the present invention, the parts being by weight.

*Example*

20 parts of 1,4-dichloro-anthraquinone, 18 parts of potassium acetate, 0,1 part of copper powder and 70 parts of 1-amino-2,6-dimethylbenzene are heated to 170–180° C., until the shade of the reaction mixture does no more change and after cooling down to about 100° C., the condensation product is isolated.

By sulphonating the base with weak oleum at 40° C. a dyestuff is obtained which dyes wool brilliant reddish-blue shades of excellent fastness to light, milling, perspiration and chromine. Its formula is:

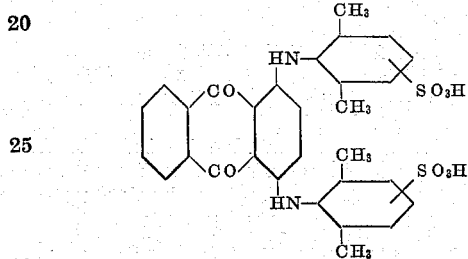

By replacing the 1-amino-2:6-dimethylbenzene by 1-amino-2:4:6-trimethylbenzene, a similar dyestuff will be obtained.

By using 1:5-dichloro-anthraquinone instead of the 1:4-compound, a red dyestuff will be obtained, which gives on wool dyeings of very good fastness to milling and to light.

What I claim is:—

1. A process for the manufacture of anthraquinone dyestuffs, consisting in condensing anthraquinone derivatives containing in α-position two members of the group consisting of halogen and hydroxy with an aromatic amine of the general formula

wherein X stands for a member of the group consisting of methyl and ethyl, Y stands for a member of the group consisting of methyl, ethyl and halogen and Z stands for a member of the group consisting of hydrogen and methyl.

2. A process for the manufacture of anthraquinone dyestuffs, consisting in condensing anthraquinone compounds containing at least two halogen atoms in α-position with an aromatic amine of the general formula

wherein X stands for a member of the group consisting of methyl and ethyl, Y stands for a member of the group consisting of methyl, ethyl and halogen and Z stands for a member of the group consisting of hydrogen and methyl, and treating the compounds thus obtained with a sulphonating agent.

3. A process for the manufacture of anthraquinone dyestuffs, consisting in condensing 1,4-dichloro-anthraquinone with 1-amino-2,4,6-trimethylbenzene and sulphonating the base thereby obtained with sulphuric acid.

4. A process for the manufacture of anthraquinone dyestuffs, consisting in condensing 1,4-dichloro-anthraquinone with 1-amino-2,6-dimethylbenzene and sulphonating the base thereby obtained with sulphuric acid.

5. The anthraquinone dyestuffs of the general formula

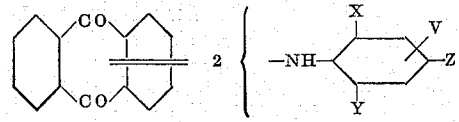

wherein Y stands for a member of the group consisting of halogen, methyl and ethyl, X represents a member of the group consisting of methyl and ethyl, V represents a member of the group consisting of hydrogen and sulpho and Z stands for a member of the group consisting of hydrogen and methyl, said dyestuffs being valuable compounds for dyeing lacquers and cellulose esters and ethers and in case they are soluble in water being suitable for dyeing animal fibres.

6. The anthraquinone dyestuffs of the general formula

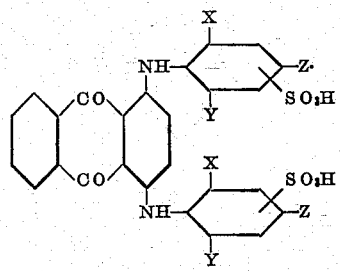

wherein x stands for a member of the group consisting of methyl and ethyl, Y stands for a member of the group consisting of halogen, methyl and ethyl and Z represents a member of the group consisting of hydrogen and methyl, said dyestuffs consisting in dry state dark powders soluble in water with a blue or bluish-red coloration and dyeing animal fibres blue to bluish-red shades.

7. The anthraquinone dyestuff of the formula

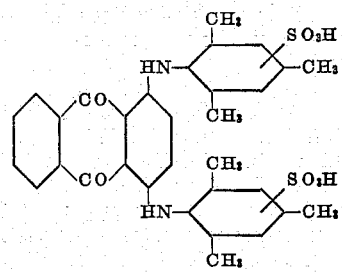

8. The anthraquinone dyestuff of the formula

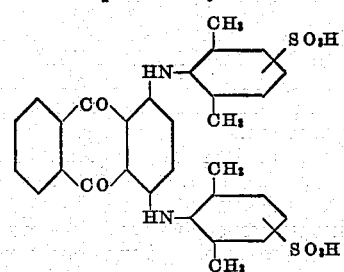

ALBIN PETER.